United States Patent
Sugawara et al.

(10) Patent No.: US 10,452,767 B2
(45) Date of Patent: Oct. 22, 2019

(54) SEMICONDUCTOR SYSTEM AND METHOD FOR SUPPORTING DATA EDITING

(71) Applicant: Tokyo Electron Limited, Tokyo (JP)

(72) Inventors: Masahiro Sugawara, Iwate (JP); Yojiro Aoki, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 27 days.

(21) Appl. No.: 15/730,818

(22) Filed: Oct. 12, 2017

(65) Prior Publication Data

US 2018/0107637 A1  Apr. 19, 2018

(30) Foreign Application Priority Data

Oct. 19, 2016  (JP) ................... 2016-205033

(51) Int. Cl.
| | |
|---|---|
| *G06F 17/24* | (2006.01) |
| *G06F 9/451* | (2018.01) |
| *G06F 3/14* | (2006.01) |
| *G06F 9/445* | (2018.01) |

(52) U.S. Cl.
CPC ............... *G06F 17/24* (2013.01); *G06F 3/14* (2013.01); *G06F 9/44505* (2013.01); *G06F 9/451* (2018.02)

(58) Field of Classification Search
CPC ...... G06F 9/451; G06F 17/24; G06F 9/44505; G06F 3/14
See application file for complete search history.

(56) References Cited

U.S. PATENT DOCUMENTS

| | | | | |
|---|---|---|---|---|
| 7,123,980 B2 * | 10/2006 | Funk | ................ | G05B 19/4184 700/121 |
| 7,395,131 B2 * | 7/2008 | Funk | ................ | G05B 15/02 700/108 |

(Continued)

FOREIGN PATENT DOCUMENTS

JP  2003-217995 A  7/2003

OTHER PUBLICATIONS

Adamov et al. "Yield Optimization through Statistical Analysis of Recipe Changes", IEEE, 2007, pp. 234-237.*

*Primary Examiner* — Maikhanh Nguyen
(74) *Attorney, Agent, or Firm* — Abelman, Frayne & Schwab

(57) ABSTRACT

A semiconductor system according to the present disclosure includes: an input receiving unit that receives comparison process requesting information; a processing unit that acquires a plurality of pieces of process related information related to a semiconductor process performed by a semiconductor manufacturing apparatus, based on the comparison process requesting information received by the input receiving unit; a screen creation unit that creates a comparison screen for comparing the plurality of pieces of process related information acquired by the processing unit; and a display unit that displays the comparison screen created by the screen creation unit. When the input receiving unit receives a selection of an arbitrary item included in the plurality of pieces of process related information displayed on the comparison screen, the screen creation unit creates an editing screen on which, among the plurality of pieces of process related information, process related information including the arbitrary item is editable.

5 Claims, 7 Drawing Sheets

(56) References Cited

U.S. PATENT DOCUMENTS

| | | | |
|---|---|---|---|
| 7,906,032 B2* | 3/2011 | Yamashita | B08B 7/00 |
| | | | 118/715 |
| 9,223,305 B2* | 12/2015 | Ikeda | G05B 19/4065 |
| 9,256,221 B2* | 2/2016 | Araki | G05B 19/41875 |
| 2005/0047645 A1* | 3/2005 | Funk | G05B 19/41865 |
| | | | 382/145 |
| 2005/0165731 A1* | 7/2005 | Funk | G05B 15/02 |
| 2005/0187649 A1* | 8/2005 | Funk | G05B 19/4184 |
| | | | 700/121 |
| 2007/0238199 A1* | 10/2007 | Yamashita | B08B 7/00 |
| | | | 438/5 |
| 2010/0106279 A1* | 4/2010 | Yamamoto | G05B 19/41865 |
| | | | 700/105 |
| 2013/0013240 A1* | 1/2013 | Ikeda | G05B 19/4065 |
| | | | 702/82 |

* cited by examiner

*FIG. 6*

| | APPARATUS A RECIPE A | APPARATUS B RECIPE B |
|---|---|---|
| | STEP 1 | STEP 1 |
| | STEP 2 | STEP 2 |
| * | STEP 3 | STEP 3 |
| * → | STEP 4 | STEP 4 |
| * | STEP 5 | STEP 5 |
| | STEP 6 | STEP 6 |
| | STEP 7 | STEP 7 |
| * | STEP 8 | STEP 8 |
| | | |
| | | |
| | | |

| | ITEM NAME | APPARATUS A RECIPE A | APPARATUS B RECIPE B |
|---|---|---|---|
| | STEP TIME | XXX | XXX |
| * | TEMPERATURE 1 | YYY | AAA |
| * | TEMPERATURE 2 | YYY | BBB |
| * | TEMPERATURE 3 | YYY | AAA |
| | PRESSURE | YYY | YYY |
| | FLOW RATE 1 | ZZZ | ZZZ |
| * | FLOW RATE 2 | ZZZ | CCC |
| | FLOW RATE 3 | ZZZ | ZZZ |
| | FLOW RATE 4 | ZZZ | ZZZ |

OVERWRITE — B2

SEMICONDUCTOR SYSTEM AND METHOD FOR SUPPORTING DATA EDITING

CROSS-REFERENCE TO RELATED APPLICATIONS

This application is based on and claims priority from Japanese Patent Application No. 2016-205033 filed on Oct. 19, 2016 with the Japan Patent Office, the disclosure of which is incorporated herein in its entirety by reference.

TECHNICAL FIELD

The present disclosure relates to a semiconductor system and a method for supporting data editing.

BACKGROUND

A control system has been known which includes a plurality of control devices that control a plurality of processing apparatuses performing a predetermined process on a processing target substrate, and a host computer that controls each of the control devices (see, e.g., Japanese Patent Laid-Open Publication No. 2003-217995).

In such a control system, for example, an administrator may compare data such as, for example, recipes or parameters among the plurality of processing apparatuses or edit the data based on the comparison result, in works such as, for example, start-up, trouble, and maintenance of a processing apparatus. There is also a case where the data is copied from one processing apparatus to another processing apparatus.

SUMMARY

A semiconductor system according to an exemplary embodiment of the present disclosure includes: an input receiving unit configured to receive comparison process requesting information; a processing unit configured to acquire a plurality of pieces of process related information that are related to a semiconductor process performed by a semiconductor manufacturing apparatus, based on the comparison process requesting information received by the input receiving unit; a screen creation unit configured to create a comparison screen for comparing the plurality of pieces of process related information acquired by the processing unit; and a display unit configured to display the comparison screen created by the screen creation unit. When the input receiving unit receives a selection of an arbitrary item included in the plurality of pieces of process related information displayed on the comparison screen, the screen creation unit creates an editing screen on which, among the plurality of pieces of process related information, process related information including the arbitrary item is editable.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a view for explaining a screen used to perform data comparison and editing.

DETAILED DESCRIPTION

Figure 1:
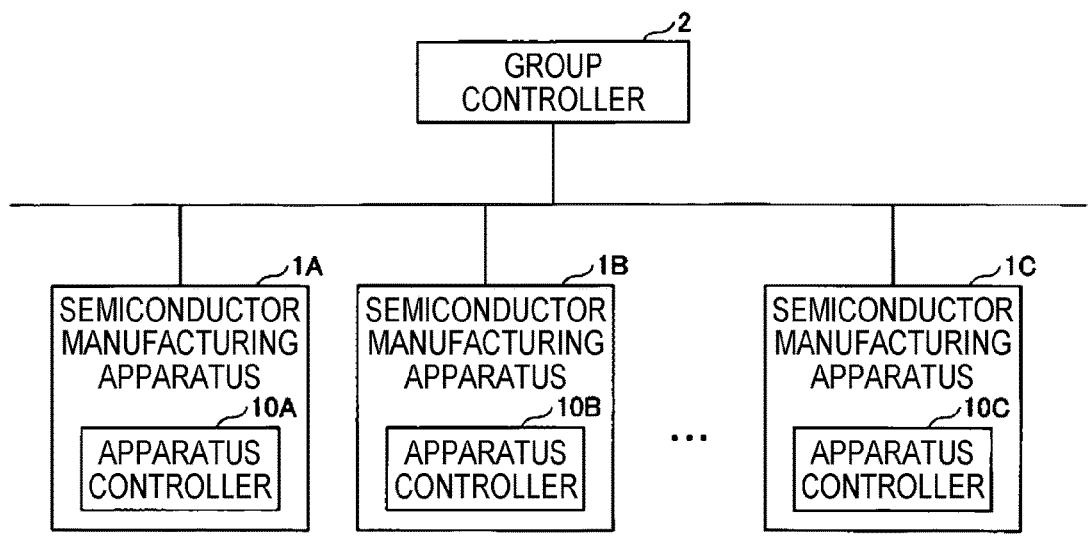
FIG. 1 is an overall configuration diagram illustrating an exemplary semiconductor system according to an exemplary embodiment of the present disclosure.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

In the related art, when editing the data based on the comparison result, for example, an administrator confirms the comparison result, temporarily stores a data item to be edited, manually starts an appropriate editor, and searches for and edits the data item on the editor. This makes the operation troublesome and there is a concern that a mistake may be caused by, for example, an administrator.

Therefore, an object of an aspect of the present disclosure is to provide a semiconductor system in which an operation mistake may be reduced by reducing the load of, for example, an administrator when editing data.

In order to achieve the above-described object, a semiconductor system according to an aspect of the present disclosure includes: an input receiving unit configured to receive comparison process requesting information; a processing unit configured to acquire a plurality of pieces of process related information that are related to a semiconductor process performed by a semiconductor manufacturing apparatus, based on the comparison process requesting information received by the input receiving unit; a screen creation unit configured to create a comparison screen for comparing the plurality of pieces of process related information acquired by the processing unit; and a display unit configured to display the comparison screen created by the screen creation unit. When the input receiving unit receives a selection of an arbitrary item included in the plurality of pieces of process related information displayed on the comparison screen, the screen creation unit creates an editing screen on which, among the plurality of pieces of process related information, process related information including the arbitrary item is editable.

A semiconductor system according to another aspect of the present disclosure includes: an input receiving unit configured to receive comparison process requesting information; a processing unit configured to acquire a plurality of pieces of process related information that are related to a semiconductor process performed by a semiconductor manufacturing apparatus, based on the comparison process requesting information received by the input receiving unit; a screen creation unit configured to create a comparison screen for comparing the plurality of pieces of process related information acquired by the processing unit; and a display unit configured to display the comparison screen created by the screen creation unit. When the input receiving unit receives a selection of an arbitrary item included in the plurality of pieces of process related information displayed on the comparison screen, the screen creation unit shifts process related information including the arbitrary item, among the plurality of pieces of process related information, to an editable state.

The above-described semiconductor system further includes a storage unit configured to store the plurality of pieces of process related information, and the processing unit acquires the plurality of pieces of process related information from the storage unit.

In the above-described semiconductor system, the plurality of pieces of process related information is information related to a process between a plurality of semiconductor manufacturing apparatuses.

In the above-described semiconductor system, the plurality of pieces of process related information is information related to different processes of the same semiconductor manufacturing apparatus.

In the above-described semiconductor system, the arbitrary item is an item to be edited.

In the above-described semiconductor system, the plurality of pieces of process related information is a recipe that represents a condition of the semiconductor process.

A method for supporting data editing according to the aspect of the present disclosure includes: receiving comparison process requesting information; acquiring a plurality of pieces of process related information that are related to a semiconductor process performed by a semiconductor manufacturing apparatus, based on the comparison process requesting information; creating a comparison screen for comparing the plurality of pieces of process related information; displaying the comparison screen; receiving a selection of an arbitrary item included in the plurality of pieces of process related information displayed on the comparison screen; and creating an editing screen on which, among the plurality of pieces of process related information, process related information including the arbitrary item is editable.

A method for supporting data editing according to the aspect of the present disclosure includes: receiving comparison process requesting information; acquiring a plurality of pieces of process related information that are related to a semiconductor process performed by a semiconductor manufacturing apparatus, based on the comparison process requesting information; creating a comparison screen for comparing the plurality of pieces of process related information; displaying the comparison screen; receiving a selection of an arbitrary item included in the plurality of pieces of process related information displayed on the comparison screen; and shifting the comparison screen to a state in which, among the plurality of pieces of process related information, process related information including the arbitrary item is editable.

According to the disclosed semiconductor system, the load of, for example, an administrator when editing data may be reduced so as to reduce an operation mistake.

Hereinafter, exemplary embodiments for implementing the present disclosure will be described with reference to the accompanying drawings. In the descriptions and drawings, substantially the same components will be denoted by the same reference numerals, and thus, overlapping descriptions thereof will be omitted.

(Semiconductor System)

A semiconductor system according to an exemplary embodiment of the present disclosure will be described. FIG. 1 is an overall configuration diagram illustrating an exemplary semiconductor system according to an exemplary embodiment of the present disclosure.

As illustrated in FIG. 1, the semiconductor system includes semiconductor manufacturing apparatuses 1 and a group controller 2. FIG. 1 illustrates three semiconductor manufacturing apparatuses 1A, 1B, and 1C and one group controller 2 as an example. However, the number of the semiconductor manufacturing apparatuses 1 and the group controllers 2 is not limited thereto, and one or more of these components may be used.

Each semiconductor manufacturing apparatus 1 performs a predetermined semiconductor process on a workpiece and manufactures, for example, a liquid crystal panel, an organic electroluminescence (EL) display, and a plasma display panel. The workpiece is, for example, a semiconductor wafer or a glass substrate. The semiconductor process may include at least a process related to a semiconductor and may be, for example, a film forming process, an etching process, or a thermal oxidation process. The semiconductor manufacturing apparatus 1 may be a batch type apparatus or a single sheet type apparatus. The semiconductor manufacturing apparatuses 1A, 1B, and 1C are provided with apparatus controllers 10A, 10B, and 10C, respectively, each controlling the operations of the respective portions of the corresponding apparatus.

Figure 2:
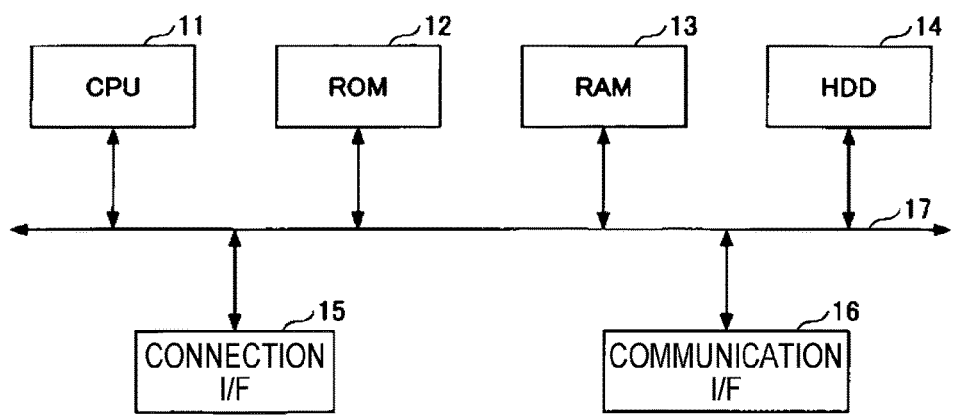
FIG. 2 is a diagram illustrating an exemplary hardware configuration of an apparatus controller.

FIG. 2 is a diagram illustrating an exemplary hardware configuration of an apparatus controller 10. As illustrated in FIG. 2, each apparatus controller 10 includes a central processing unit (CPU) 11, a read only memory (ROM) 12, a random access memory (RAM) 13, a hard disk drive (HDD) 14, a connection interface (I/F) 15, and a communication I/F 16 which are connected with each other via a bus 17.

The CPU 11 controls the overall operation of a semiconductor manufacturing apparatus 1 by executing a program stored in, for example, the ROM 12 or the HDD 14 with the RAM 13 as a work area. Each of the components of the semiconductor manufacturing apparatus 1 is connected to the connection I/F 15. The communication I/F 16 is an interface that communicates with, for example, the group controller 2 and the other apparatus controllers 10 by wired or wireless communication.

In the apparatus controller 10, a program for performing a predetermined semiconductor process on the workpiece is installed in advance. For example, an administrator or an operator (hereinafter, referred to as the "administrator or the like") of the semiconductor manufacturing apparatus 1 may perform operations with the semiconductor manufacturing apparatus 1 in which the program is installed, to perform various substrate processings through the apparatus controller 10.

The group controller 2 is a device constituting a semiconductor system, is connected to communicate with one or more semiconductor manufacturing apparatuses 1 via a wired or wireless communication network, and is capable of storing various types of information transmitted from one or more semiconductor manufacturing apparatuses 1. The communication network may be, for example, a network of a manufacturing execution system (MES) that manages manufacturing processes of the entire factory in which the semiconductor system is installed. Further, the communication network may be, for example, the Internet, an intranet, or a public telephone line network.

Figure 3:
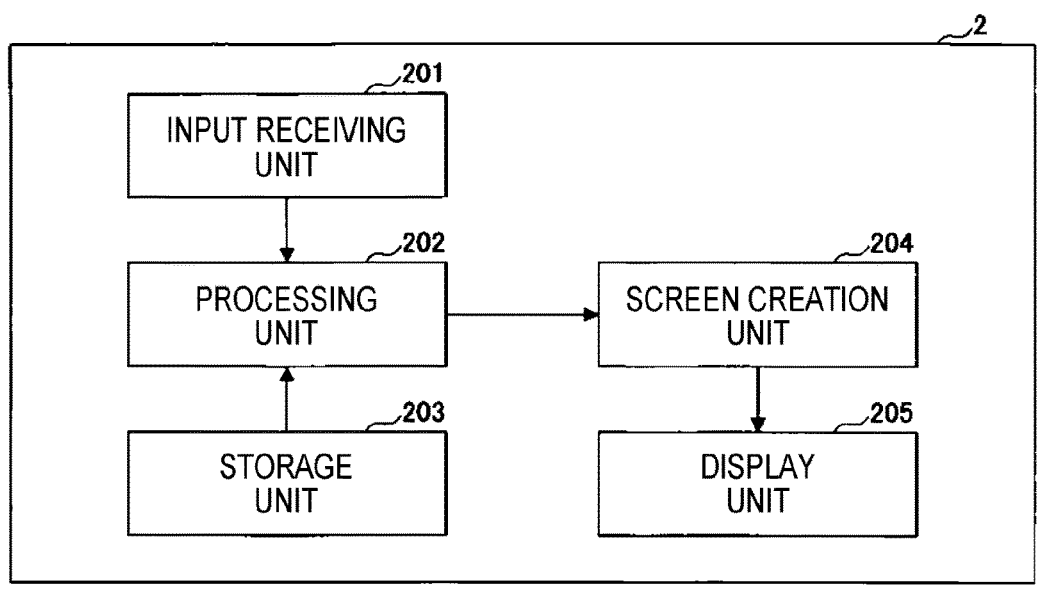
FIG. 3 is a block diagram illustrating an exemplary functional configuration of a group controller.

FIG. 3 is a block diagram illustrating an exemplary functional configuration of the group controller. As illustrated in FIG. 3, the group controller 2 includes an input receiving unit 201, a processing unit 202, a storage unit 203, a screen creation unit 204, and a display unit 205. Also, the group controller 2 may include a transmitting/receiving unit that transmits/receives information to/from the apparatus controller 10 of the semiconductor manufacturing apparatus 1.

The input receiving unit 201 receives various types of process requesting information that are input from an input device (e.g., a keyboard, a mouse, or a touch panel). The process requesting information includes comparison process requesting information that compares information related to a semiconductor process such as, for example, recipes or parameters among the plurality of semiconductor manufacturing apparatuses 1 (hereinafter, referred to as "process related information"). The recipes are information that indicates conditions of the semiconductor process, for example, processing time, a temperature, a pressure, and a flow rate of a processing gas. The parameters are information that indicates values required for the operation of each semiconductor manufacturing apparatus 1, for example, a lower limit value or an upper limit value of a set pressure. The comparison process requesting information includes identification information of the semiconductor manufacturing apparatuses 1 to be compared with each other and types of the process related information. The identification information of the semiconductor manufacturing apparatuses 1 may be information that may identify the semiconductor manufacturing apparatuses 1, and is not particularly limited. The types of the process related information are, for example, recipes or parameters.

The processing unit 202 acquires the process related information of the semiconductor manufacturing apparatuses 1 to be compared with each other, which is stored in the storage unit 203, according to the process requesting information received by the input receiving unit 201. Specifically, for example, when the input receiving unit 201 receives the process requesting information that compares Recipe A of the semiconductor manufacturing apparatus 1A with Recipe B of the semiconductor manufacturing apparatus 1B, the processing unit 202 acquires Recipe A of the semiconductor manufacturing apparatus 1A and Recipe B stored in the semiconductor manufacturing apparatus 1B which are stored in the storage unit 203. Further, for example, when the input receiving unit 201 receives the process requesting information that compares Parameter A of the semiconductor manufacturing apparatus 1A with Parameter B of the semiconductor manufacturing apparatus 1B, the processing unit 202 acquires Parameter A of the semiconductor manufacturing apparatus 1A and Parameter B of the semiconductor manufacturing apparatus 1B which are stored in the storage unit 203. In addition, the processing unit 202 may be implemented, for example, by a memory. The processing procedure of the processing unit 202 is implemented by software, and the software is stored in a storage medium such as, for example, a hard disk drive (HDD) or a read only memory (ROM). However, the process procedure of the processing unit 202 may be implemented by hardware (dedicated circuit).

The storage unit 203 stores the process related information such as, for example, recipes or parameters that are used in the semiconductor manufacturing apparatuses 1 connected via a communication network. The process related information stored in the storage unit 203 may be, for example, information transmitted via a communication network or information input via an input device. In addition, the storage unit 203 may be implemented by a storage medium such as, for example, a semiconductor memory, a magnetic disk, or an optical disk.

The screen creation unit 204 creates various screens including a comparison screen and an editing screen. The comparison screen is a screen used to compare the process related information between the plurality of semiconductor manufacturing apparatuses 1. The comparison screen is created when the input receiving unit 201 receives the comparison process requesting information. The editing screen is a screen used to edit the process related information and is configured such that each of the items of the process related information is editable. The editing screen is created when the input receiving unit 201 receives a selection of one or more arbitrary items from the items included in the process related information, in the comparison screen that displays the result of the comparison of the process related information between the plurality of semiconductor manufacturing apparatuses 1. Further, the details of the comparison screen and the editing screen will be described later.

The display unit 205 displays various screens including the comparison screen and the editing screen created by the screen creation unit 204. Further, the display unit 205 may or may not include a display device (e.g., a liquid crystal display) that displays various images. In addition, the display unit 205 may be implemented by hardware or software such as, for example, a driver that drives a display device.

Figure 4:
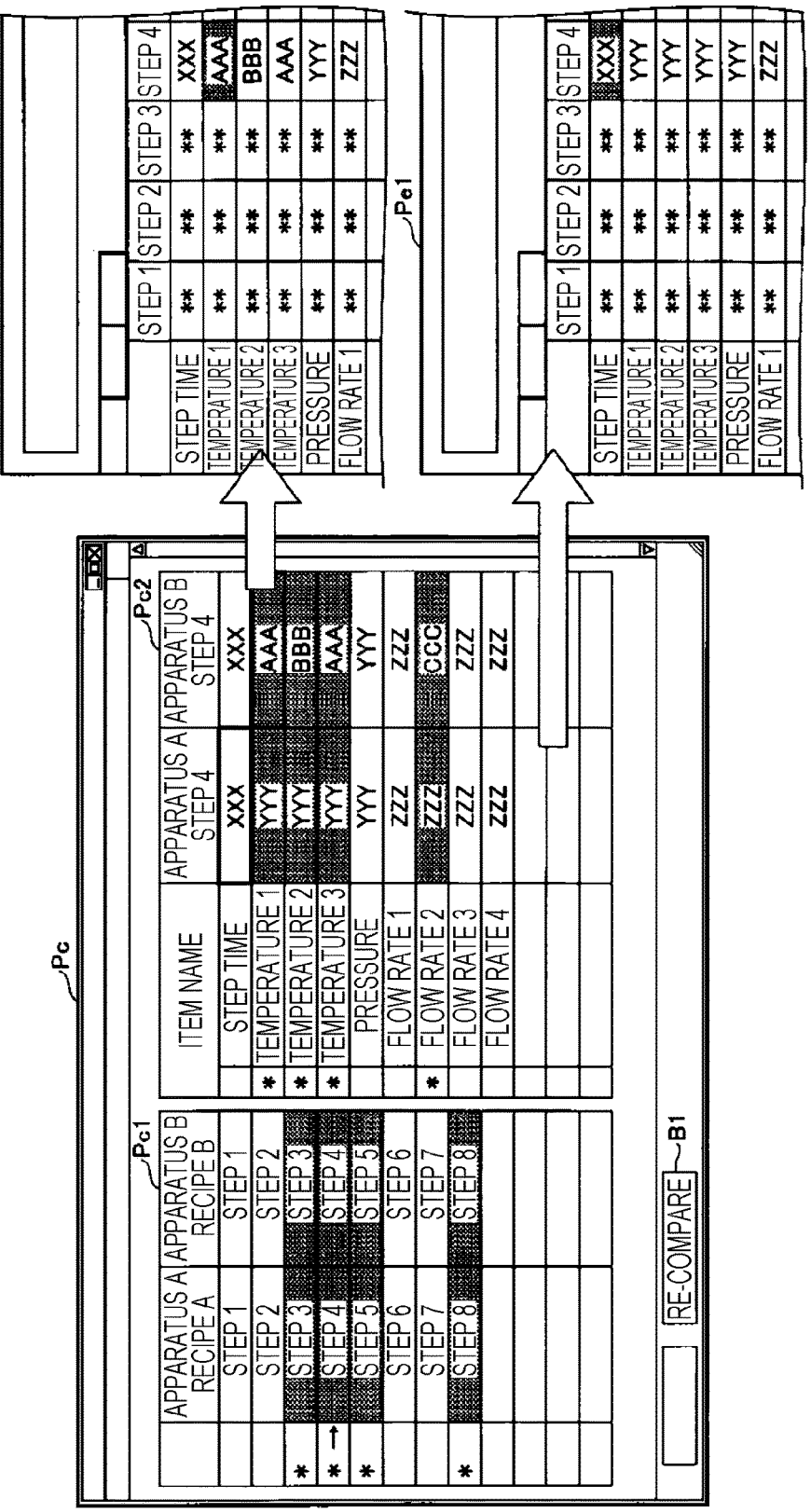
FIG. 4 is a view for explaining a screen used to perform data comparison and editing.

Next, an example of the comparison screen and the editing screen will be described. FIG. 4 is a view for explaining a screen used to perform data comparison and editing.

The comparison screen Pc is a screen used to compare the process related information between the plurality of semiconductor manufacturing apparatuses 1. The comparison screen Pc is created when the input receiving unit 201 receives the comparison process requesting information. The comparison screen Pc includes a first region Pc1 and a second region Pc2, for example, as illustrated in FIG. 4.

The first region Pct is a region that displays the process related information of the semiconductor manufacturing apparatuses 1 to be compared with each other. In the example illustrated in FIG. 4, the first region Pct displays "Recipe A," which is the process related information of the semiconductor manufacturing apparatus 1A, and "Recipe B," which is the process related information of the semiconductor manufacturing apparatus 1B. Each of "Recipe A" and "Recipe B" is information that indicates conditions of the semiconductor process including steps from "Step 1" to "Step 8." Further, in the first region Pc1, different steps between "Recipe A" and "Recipe B" to be compared with each other are indicated with "*" and "markers" to be distinguished from the other steps. Thus, an administrator or the like may easily find the different steps between the compared "Recipe A" and "Recipe B" by referring to the first region Pct of the comparison screen Pc. Specifically, the administrator or the like may easily find that "Step 3," "Step 4," "Step 5," and "Step 8" are different steps between "Recipe A" and "Recipe B." Further, the indication of the different steps is not limited to "*" and "markers." For example, the different steps may be displayed in upper rows, and the same steps may be displayed in lower rows than the rows of the different steps.

The second region Pc2 is a region that displays detailed conditions of the process related information of the semiconductor manufacturing apparatuses 1 to be compared with each other, which is displayed in the first region Pc1. In the example illustrated in FIG. 4, the second region Pc2 lists detailed conditions of "Step 4," which is one step selected from the plurality of steps of "Recipe A" and "Recipe B" displayed in the first region Pc1. Also, in FIG. 4, "Step 4," which is the selected step, is indicated by an arrow. The detailed conditions of "Step 4" include items such as, for example, "Step Time," "Temperature 1," "Temperature 2," "Temperature 3," "Pressure," "Flow Rate 1," "Flow Rate 2," "Flow Rate 3," and "Flow Rate 4." Further, in the second region Pc2, different items between "Step 4" of "Recipe A" and "Step 4" of "Recipe B" to be compared with each other are indicated with "*" and "markers" to be distinguished from the other items. Thus, an administrator or the like may easily find the different items between the compared "Step 4" of "Recipe A" and "Step 4" of "Recipe B" by referring to the second region Pc2 of the comparison screen Pc. Specifically, the administrator or the like may easily find that "Temperature 1," "Temperature 2," "Temperature 3," and "Flow Rate 2" are different steps between "Step 4" of "Recipe A" and "Step 4" of "Recipe B."

In addition, the comparison screen Pc may include a button for re-comparing the process related information between the plurality of semiconductor manufacturing apparatuses 1 after editing the process related information (hereinafter, referred to as "re-comparison button B1"). As a result, the administrator or the like may check whether the process related information has been appropriately edited, by selecting the re-comparison button B1 after editing the process related information.

The editing screen Pe is a screen used to edit the process related information and is configured such that each of the items of the process-related information is editable. The editing screen Pe is created when the input receiving unit 201 receives a selection of one or more arbitrary items from the items included in the process related information in the comparison screen Pc that displays the result of the comparison of the process related information between the plurality of semiconductor manufacturing apparatuses 1. Further, the item selected by the administrator or the like in the comparison screen Pc may be displayed in a specified state such that, for example, the selected item in the comparison screen Pc is displayed in a selected state even on the editing screen Pe. The editing screen Pe includes a first editing screen Pe1 and a second editing screen Pe2, for example, as illustrated in FIG. 4.

The first editing screen Pe1 is a screen that lists detailed conditions of all the steps of "Recipe A" and is configured to be editable. Thus, the administrator or the like may directly edit the items to be edited from the detailed conditions of "Recipe A" on the first editing screen Pe1. A method for editing the data is not particularly limited, but may be a selection/input operation using, for example, a keyboard, a mouse, or a touch panel.

The second editing screen Pe2 is a screen that lists detailed conditions of all the steps of "Recipe B" and is configured to be editable. Thus, the administrator or the like may directly edit the items to be edited from the detailed conditions of "Recipe B" on the second editing screen Pe2. A method for editing the data is not particularly limited, but may be a selection/input operation using, for example, a keyboard, a mouse, or a touch panel.

The example illustrated in FIG. 4 represents a case where "Step Time" in "Step 4" of "Recipe A" and "Temperature 1" in "Step 4" of "Recipe B" in the second region Pc2 of the comparison screen Pc are selected (indicated by a thick frame in FIG. 4). In this case, on the first editing screen Pe1, the "Step Time" of the selected "Step 4" in the second region Pc2 of the comparison screen Pc is displayed in a selected state (indicated by shading in FIG. 4). Further, on the second editing screen Pe2, the "Temperature 1" of the selected "Step 4" in the second region Pc2 of the comparison screen Pc is displayed in a selected state (indicated by shading in FIG. 4).

In the semiconductor system according to the exemplary embodiment of the present disclosure, the editing screen Pe is automatically displayed when the input receiving unit 201 receives a selection of one or more arbitrary items from the items included in the process related information in the comparison screen Pc that displays the result of the comparison of the process related information between the plurality of semiconductor manufacturing apparatuses 1. Thus, when comparing the process related information between the plurality of semiconductor manufacturing apparatuses 1 and editing the process related information of a specific semiconductor manufacturing apparatus 1 based on the comparison result, there is no need for the administrator or the like to temporarily store the items of the process related information to be edited after confirming the comparison result. Further, there is no need to manually start appropriate editing software (editor), and there is no need to search for items of data to be edited on the editor. As a result, the load of the administrator or the like when editing data may be reduced so as to reduce an operation mistake.

Figure 5:
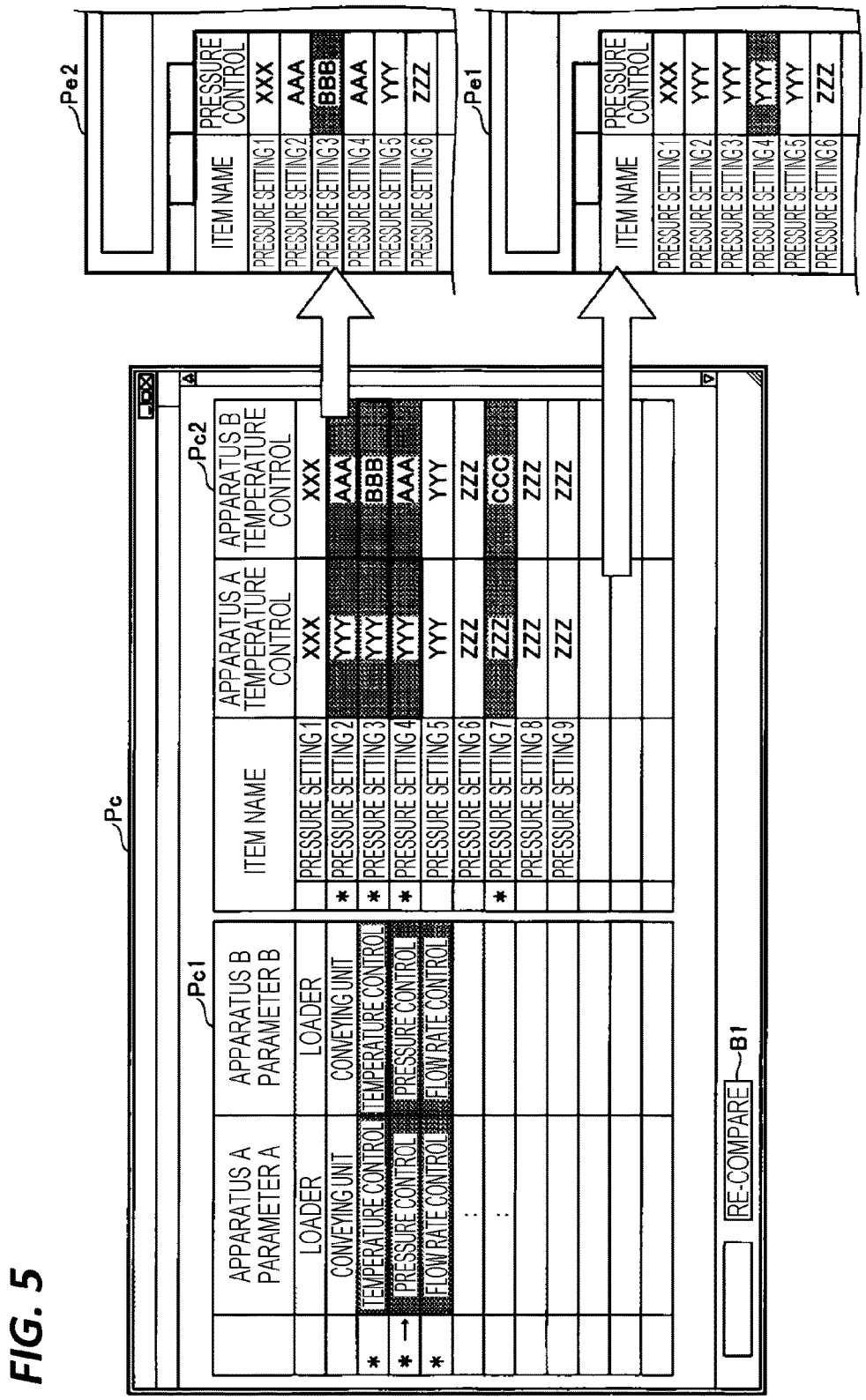
FIG. 5 is a view for explaining a screen used to perform data comparison and editing.

Next, another example of the comparison screen and the editing screen will be described. FIG. 5 is a view for explaining a screen used to perform data comparison and editing.

The example illustrated in FIG. 5 is different from the example illustrated in FIG. 4 in that, in FIG. 5, the process related information of the semiconductor manufacturing apparatuses 1 is parameters. Since the other configurations of FIG. 5 are the same as those in the example illustrated in FIG. 4, descriptions of the configurations of FIG. 5 will be partially omitted.

In the example illustrated in FIG. 5, the first region Pct displays "Parameter A," which is the process related information of the semiconductor manufacturing apparatus 1A, and "Parameter B," which is the process related information of the semiconductor manufacturing apparatus 1B. "Parameter A" and "Parameter B" are information required for the operations of the respective portions of the semiconductor manufacturing apparatuses 1, such as, for example, "Loader," "Conveying Unit," "Temperature Control," "Pressure Control," and "Flow Rate Control." Further, in the first region Pc1, different items between "Parameter A" and "Parameter B" to be compared with each other are indicated with "*" and "markers" to be distinguished from the other items. Thus, an administrator or the like may easily find the different items between "Parameter A" and "Parameter B" to be compared with each other by referring to the first region Pct of the comparison screen Pc. Specifically, the administrator or the like may easily find that "Temperature Control," "Pressure Control," and "Flow Rate Control" are different items between "Parameter A" and "Parameter B."

The second region Pc2 is a region that indicates detailed conditions of the process related information of the semiconductor manufacturing apparatuses 1 to be compared with each other, which is displayed in the first region Pc1. In the example illustrated in FIG. 5, the second region Pc2 lists detailed conditions of "Temperature Control," which is one item selected from the plurality of items of "Parameter A" and "Parameter B" displayed in the first region Pct. Also, in FIG. 5, the selected item is indicated by an arrow. The detailed conditions of "Temperature Control" include items such as, for example, "Pressure Setting 1," "Pressure Setting 2," "Pressure Setting 3," "Pressure Setting 4," "Pressure Setting 5," "Pressure Setting 6," "Pressure Setting 7," "Pressure Setting 8," and "Pressure Setting 9." These pressure setting values are, for example, lower limit values or upper limit values. Further, in the second region Pc2, different items between "Pressure Control" of "Parameter A" and "Pressure Control" of "Parameter B" to be compared with each other are indicated with "*" and "markers" to be distinguished from the other items. Thus, an administrator or the like may easily find the different items between "Pressure Control" of "Parameter A" and "Pressure Control" of "Parameter B" by referring to the second region Pc2 of the comparison screen Pc. Specifically, the administrator or the like may easily find that "Pressure Setting 2," "Pressure Setting 3," "Pressure Setting 4," and "Pressure Setting 7" are different items between "Parameter A" and "Parameter B."

The editing screen Pe is a screen used to edit the process related information and is configured such that each of the items of the process related information is editable. The editing screen Pe is created when the input receiving unit 201 receives a selection of one or more arbitrary items from the items included in the process related information in the comparison screen that displays the result of the comparison of the process related information between the plurality of semiconductor manufacturing apparatuses 1. Further, the item selected by the administrator or the like in the comparison screen Pc may be displayed in a specified state such that, for example, the selected item in the comparison screen Pc is displayed in a selected state even on the editing screen Pe. The editing screen Pe includes a first editing screen Pe1 and a second editing screen Pe2, for example, as illustrated in FIG. 5.

The first editing screen Pe1 is a screen that lists detailed conditions of all the steps of "Parameter A" and is configured to be editable. Thus, the administrator or the like may directly edit the items to be edited from the detailed conditions of "Parameter A" on the first editing screen Pe1. A method for editing the data is not particularly limited, but may be a selection/input operation using, for example, a keyboard, a mouse, or a touch panel.

The second editing screen Pe2 is a screen that lists detailed conditions of all the steps of "Parameter B" and is configured to be editable. Thus, the administrator or the like may directly edit the items to be edited from the detailed conditions of "Parameter B" on the second editing screen Pe2. A method for editing the data is not particularly limited, but may be a selection/input operation using, for example, a keyboard, a mouse, or a touch panel.

The example illustrated in FIG. 5 represents a case where "Pressure Setting 4" in "Pressure Control" of "Parameter A" and "Pressure Setting 3" in "Pressure Control" of "Parameter B" in the second region Pc2 of the comparison screen Pc are selected (indicated by a thick frame in FIG. 5). In this case, in the first editing screen Pe1, the "Pressure Setting 4" of the selected "Pressure Control" in the second region Pc2 of the comparison screen Pc is displayed in a selected state (indicated by shading in FIG. 5). Further, in the second editing screen Pe2, the "Pressure Setting 3" of the selected "Pressure Control" in the second region Pc2 of the comparison screen Pc is displayed in a selected state (indicated by shading in FIG. 5).

Next, still another example of the comparison screen and the editing screen will be described. FIG. 6 is a view for explaining a screen used to perform data comparison and editing.

In the example illustrated in FIG. 6, the comparison screen Pc is configured to be editable. That is, the example illustrated in FIG. 6 is different from the example illustrated in FIG. 4 in that the comparison screen Pc and the editing screen Pe in FIG. 6 are configured by the same screen.

The comparison screen Pc is a screen that is used to compare the process related information between the plurality of semiconductor manufacturing apparatuses 1, is used to edit the process related information, and is configured to be editable. The comparison screen Pc is created when the input receiving unit 201 receives the comparison process requesting information.

The comparison screen Pc includes a first region Pc1 and a second region Pc2, for example, as illustrated in FIG. 6. Similarly to the example illustrated in FIG. 4, the first region Pc1 is a region that displays the process related information of the semiconductor manufacturing apparatuses 1 to be compared with each other. The second region Pc2 is a region that displays detailed conditions of the process related information of the semiconductor manufacturing apparatuses 1 to be compared with each other, which is displayed in the first region Pc1.

The first region Pc1 may have the configuration similar to that in the example illustrated in FIG. 4.

The second region Pc2 is configured to be editable by a selection/input operation using, for example, a keyboard, a mouse, or a touch panel, and also functions as an editable screen Pe. Thus, the administrator or the like may directly edit the process related information on the second region Pc2. That is, the administrator or the like may compare and edit the process related information on one screen.

Further, the comparison screen Pc may include a button for overwriting the process related information of one semiconductor manufacturing apparatus 1 to the process related information of another semiconductor manufacturing apparatus 1 (hereinafter, referred to as "overwrite button B2"), among the process related information of the plurality of semiconductor manufacturing apparatuses 1. Thus, the administrator or the like may collectively copy the process related information of one semiconductor manufacturing apparatus 1 to the process related information of another semiconductor manufacturing apparatus 1 by selecting the overwrite button B2. For this reason, when collectively copying the process related information of one semiconductor manufacturing apparatus 1 to the process related information of another semiconductor manufacturing apparatus 1, the administrator or the like may input the process related information in short time. In particular, for example, when the plurality of semiconductor manufacturing apparatuses 1 are started up, it is required to input the process related information such as, for example, a large number of recipes and parameters. However, since the overwrite button B2 is provided, the inputting may be performed in short time without causing a mistake.

(Operation of Semiconductor System)

Figure 7:
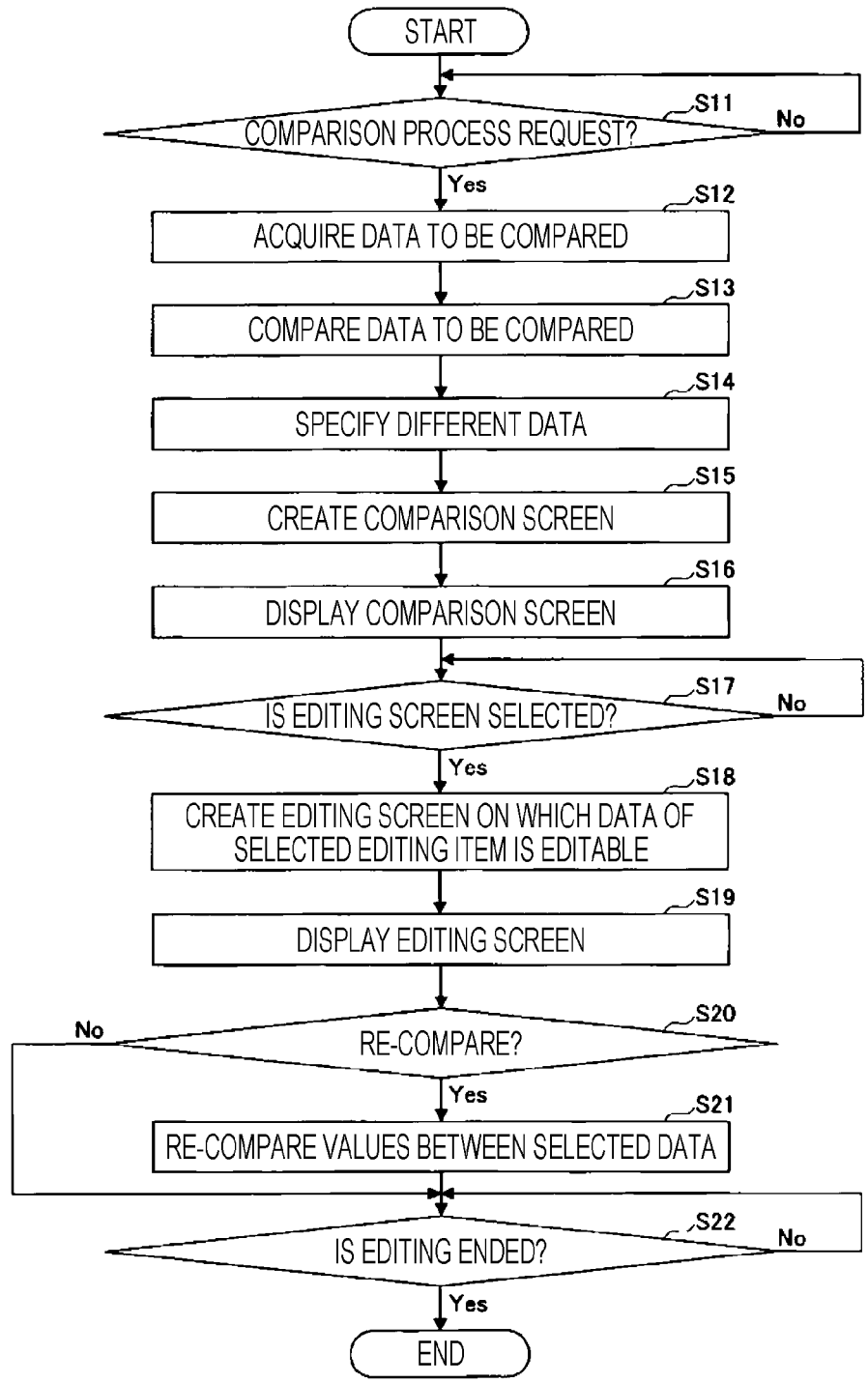
FIG. 7 is a flowchart for explaining a method for supporting data editing according to an exemplary embodiment of the present disclosure.

Next, an exemplary operation of the semiconductor system according to the exemplary embodiment of the present disclosure will be described. FIG. 7 is a flowchart for explaining a method for supporting data editing according to the exemplary embodiment of the present disclosure.

First, when the input receiving unit 201 receives the comparison process requesting information (step S11), the processing unit 202 acquires the data to be compared with each other that are stored in the storage unit 203 (step S12). Specifically, when the input receiving unit 201 receives the identification information of the semiconductor manufacturing apparatuses 1 to be compared with each other and the types of the process related information, the processing unit 202 acquires the process related information of the semiconductor manufacturing apparatuses 1 to be compared with each other, from the storage unit 203 based on the identification information of the semiconductor manufacturing apparatuses 1 and the types of the process related information.

Subsequently, the processing unit 202 compares the data of the process related information of the semiconductor manufacturing apparatuses 1 to be compared with each other, which are acquired in step S12 (step S13), and specifies different data in the process related information (step S14).

Subsequently, the screen creation unit 204 creates the comparison screen Pc based on the data to be compared with each other, which are acquired by the processing unit 202 in step S12, and the data specified by the processing unit 202 in step S14 (step S15). Then, the display unit 205 displays the comparison screen Pc created by the screen creation unit 204 in step S15 (step S16).

Subsequently, when the input receiving unit 201 receives a selection of an item to be edited on the comparison screen Pc (hereinafter, referred to as "editing item") (step S17), the screen creation unit 204 creates an editing screen Pe on which the selected editing item is editable (step S18). Then, the display unit 205 displays the editing screen created by the screen creation unit 204 (step S19).

Subsequently, when the input receiving unit 201 receives the re-comparison operation (step S20), the processing unit 202 re-compares the data to be compared with each other after editing (step S21).

Subsequently, when the input receiving unit 201 receives an operation to end the editing (step S22), the processing unit 202 ends the process. Further, the contents edited in the editing screen Pe may be stored in the storage unit 203 before the process is ended, and a selection screen on which it may be selected whether to store the contents edited on the editing screen Pe in the storage unit 203 may be displayed.

As described above, in the method for supporting data editing according to the exemplary embodiment of the present disclosure, the editing screen Pe is automatically displayed when the input receiving unit 201 receives a selection of one or more arbitrary items from the items included in the process related information in the comparison screen Pc that displays the result of the comparison of the process related information between the plurality of semiconductor manufacturing apparatuses 1. Thus, when comparing the process related information between the plurality of semiconductor manufacturing apparatuses 1 and editing the process related information of a specific semiconductor manufacturing apparatus 1 based on the comparison result, there is no need for the administrator or the like to temporarily store the items of the process related information to be edited after confirming the comparison result. Further, there is no need to manually start appropriate editing software (editor), and there is no need to search for items of data to be edited on the editor. As a result, the load of the administrator or the like when editing data may be reduced so as to reduce an operation mistake.

Figure 8:
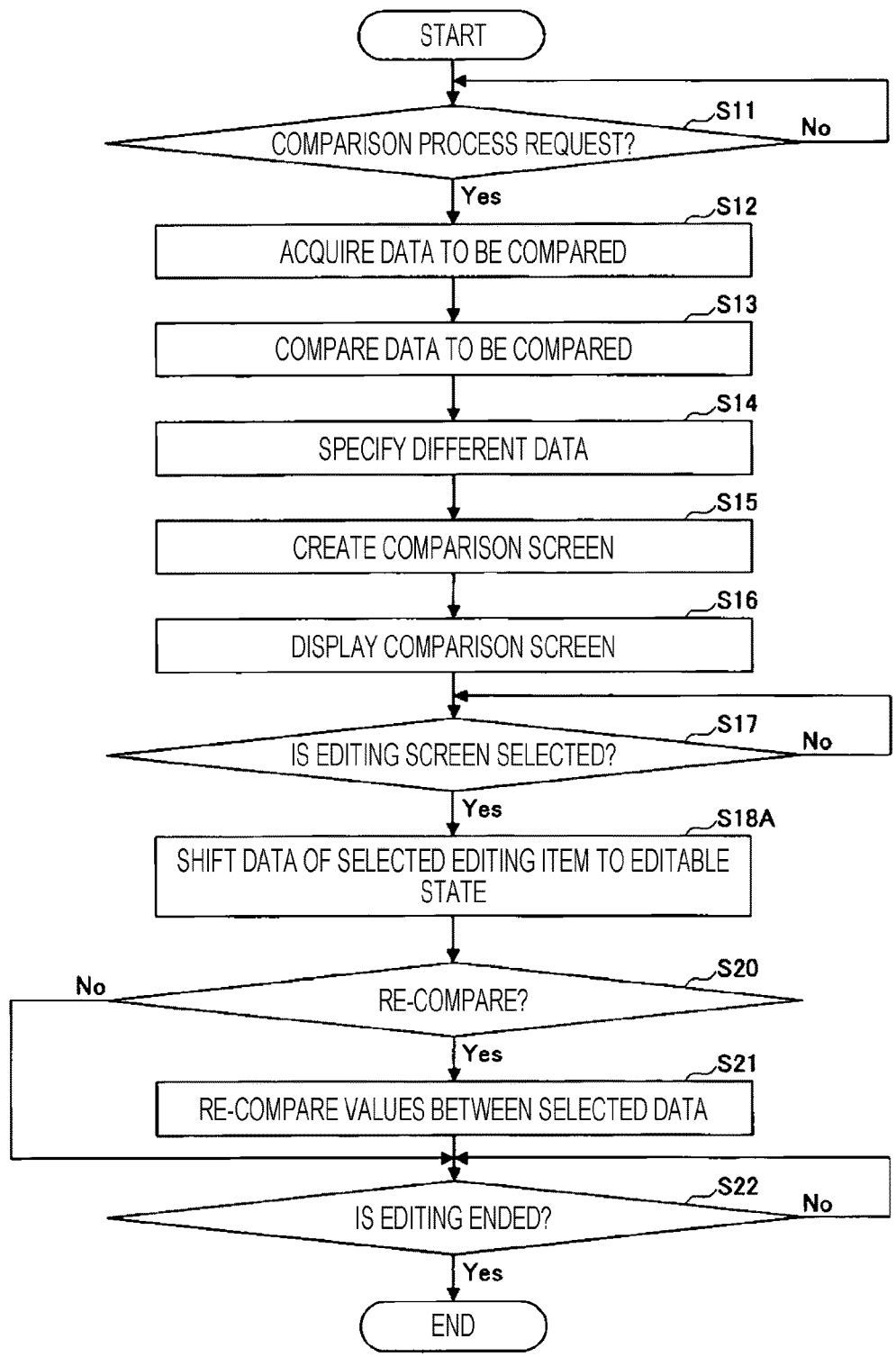
FIG. 8 is a flowchart for explaining a method for supporting data editing according to an exemplary embodiment of the present disclosure.

Next, another exemplary operation of the semiconductor system according to the exemplary embodiment of the present disclosure will be described. FIG. 8 is a flowchart for explaining a method for supporting data editing according to the exemplary embodiment of the present disclosure.

The example illustrated in FIG. 8 is different from the example illustrated in FIG. 7 in that, in FIG. 8, when the input receiving unit 201 receives a selection of an item to be edited on the second region Pc2 of the comparison screen Pc (step S17), the screen creation unit 204 shifts the data of the selected editing item to an editable state (step S18A). The other configurations of FIG. 8 are the same as those in the example illustrated in FIG. 7.

As described above, in the example illustrated in FIG. 8, when the input receiving unit 201 receives a selection of an item to be edited on the second region Pc2 of the comparison screen Pc, the screen creation unit 204 shifts the data of the selected editing item to an editable state. Thus, the administrator or the like may directly edit the process related information on the second region Pc2. That is, the administrator or the like may compare and edit the process related information on one screen.

In the above-described exemplary embodiment, by way of example, the case where the comparison screen Pc and the editing screen Pe are displayed on the group controller 2 has been described. However, the present disclosure is not limited thereto, and the comparison screen Pc and the editing screen Pe may be displayed, for example, on the apparatus controller 10 of the semiconductor manufacturing apparatus 1. In this case, the apparatus controller 10 may be configured to have the above-described function of the group controller 2.

Further, in the above-described exemplary embodiment, by way of example, descriptions have been made on the case where the processing unit 202 acquires the process related information of the semiconductor manufacturing apparatuses 1 to be compared with each other, which is stored in the storage unit 203, according to the process requesting information received by the input receiving unit 201. However, the present disclosure is not limited thereto, and for example, the processing unit 202 may acquire the process related information stored in the apparatus controllers 10 of the semiconductor manufacturing apparatuses 1 to be compared with each other, which are connected via a communication network, according to the process requesting information received by the input receiving unit 201.

Further, in the above-described exemplary embodiment, by way of example, the case where the process related information between the different semiconductor manufacturing apparatuses 1 is compared and edited has been described. However, the present disclosure is not limited thereto, and for example, different pieces of process related information of the same semiconductor manufacturing apparatus 1 that have a time difference may be compared and edited.

In addition, the above-described exemplary embodiment, by way of example, the case where the process related information is recipes or parameters used in the semiconductor manufacturing apparatuses 1 has been described. However, the present disclosure is not limited thereto, and the process related information may be other information related to the semiconductor process in the semiconductor manufacturing apparatuses 1.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A semiconductor system comprising:
   an input receiver configured to receive comparison process requesting information;

a processor connected to the input receiver and configured to:
acquire a plurality of pieces of process related information that are related to a semiconductor process performed by a semiconductor manufacturing apparatus and includes one or more recipes and parameters, based on the comparison process requesting information received by the input receiver;
compare the acquired plurality of pieces of process related information; and
specify different data from each other in the plurality of pieces of process related information;
a screen creator connected to the processor and configured to create a comparison screen that compares the plurality of pieces of process related information based on the different data specified by the processor; and
a display connected to the screen creator and configured to display the comparison screen created by the screen creator,
wherein, when the input receiver receives a selection of one or more editing items to be edited on the comparison screen that are arbitrary items included in the plurality of pieces of process related information displayed on the comparison screen, the screen creator creates an editing screen on which, among the plurality of pieces of process related information, process related information including the one or more editing items is editable such that the editing screen created by the screen creator is displayed without manually starting an editor before the process related information is edited, and
wherein the plurality of pieces of process related information is information related to a plurality of processes between a plurality of semiconductor manufacturing apparatuses.

2. The semiconductor system of claim 1, further comprising: a storage connected to the processor and configured to store the plurality of pieces of process related information, wherein the processor acquires the plurality of pieces of process related information from the storage.

3. The semiconductor system of claim 1, wherein the comparison screen includes a re-comparison button that re-compares the plurality of pieces of process related information after the process related information among the plurality of pieces of process related information is edited.

4. The semiconductor system of claim 1, wherein the plurality of pieces of process related information is information related to different processes of a same semiconductor manufacturing apparatus.

5. A method for supporting data editing, the method comprising:
receiving comparison process requesting information;
acquiring a plurality of pieces of process related information that are related to a semiconductor process performed by a semiconductor manufacturing apparatus and includes one or more recipes and parameters, based on the comparison process requesting information;
comparing the acquired plurality of pieces of process related information; and
specifying different data from each other in the plurality of pieces of process related information;
creating a comparison screen that compares the plurality of pieces of process related information based on the different data specified at the specifying;
displaying the comparison screen created at the creating;
receiving a selection of one or more editing items to be edited on the comparison screen that are arbitrary items included in the plurality of pieces of process related information displayed on the comparison screen; and
creating an editing screen on which, among the plurality of pieces of process related information, process related information including the one or more editing items is editable such that the editing screen created at the creating is displayed without manually starting an editor before the process related information is edited,
wherein the plurality of pieces of process related information is information related to a plurality of processes between a plurality of semiconductor manufacturing apparatuses.

* * * * *